Feb. 7, 1967 H. WENZ 3,303,328

PUNCHED CARD RETRIEVAL AND SCANNING APPARATUS

Filed Nov. 16, 1962

4 Sheets-Sheet 1

INVENTOR
Herbert WENZ
BY
ATTORNEY

Feb. 7, 1967 H. WENZ 3,303,328

PUNCHED CARD RETRIEVAL AND SCANNING APPARATUS

Filed Nov. 16, 1962

4 Sheets-Sheet 2

INVENTOR
Herbert WENZ

BY

[signature]

ATTORNEY

INVENTOR
Herbert WENZ
BY
[signature]
ATTORNEY

Feb. 7, 1967 H. WENZ 3,303,328

PUNCHED CARD RETRIEVAL AND SCANNING APPARATUS

Filed Nov. 16, 1962 4 Sheets-Sheet 4

INVENTOR
Herbert WENZ
BY [signature]
ATTORNEY

United States Patent Office 3,303,328

Patented Feb. 7, 1967

3,303,328

PUNCHED CARD RETRIEVAL AND SCANNING APPARATUS

Herbert Wenz, Kaiserslautern, Pfalz, Germany, assignor to G. M. Pfaff AG., Kaiserslautern, Pfalz, Germany, a corporation of Germany Filed Nov. 16, 1962, Ser. No. 238,131
10 Claims. (Cl. 235—61.11)

The present invention relates to punched storage card retrieval and scanning apparatus of the general type comprising a storage magazine holding a number of punched or perforated control cards with means to remove said cards by a pushing rod or pickup finger and to step-by-step feed the same to a scanning station by the aid of a feed roller, for the retrieval of the information carried or for the control of an output device or machine in accordance with a predetermined operating program stored upon the cards.

There have heretofore become known punched card feeding and scanning devices of this type, whereby a band or card-shaped perforated record carrier is fed to and passed through a scanning station by means of an intermittent or step-by-step operated feeding mechanism. Such devices ordinarily are designed for use with standard punched cards as available on the market which have a predetermined size or storage capacity, or range covering a predetermined operating program.

In order to enable the use and selection of one of a plurality of cards to be applied to the feeding and scanning mechanism, it has furthermore become known to utilize a storage magazine adapted to accommodate a stack comprising a predetermined number of cards and to remove the cards from the bottom of the stack singly and sequentially in their stacking order by means of suitable stripping or pickup means.

In order to have the cards of a magazine ready for a subsequent use or scanning operation in the same or original stacking order, upon passing the scanning station during a preceding retrieving cycle, it has furthermore become known to provide a second or take-up magazine disposed behind the scanning station, in addition to the supply magazine disposed ahead of said station, whereby the cards will be deposited within said take-up magazine in their original order or sequence of feeding to the scanning device. To this end, the magazines are provided with both an open bottom and top, to enable the cards to be introduced from the top and to be removed from the bottom of the magazines by means of a suitable stripping device, the cards readily dropping into engagement with said device by virtue of their own weight or gravity. In the take-up magazine, a stop element projecting into the open bottom space serves to prevent the cards being deposited from falling through the magazine.

Card feed and scanning devices of the afore-described type have the disadvantage, among others, of requiring at least two magazines and of impeding the removal or stripping of the lowermost card of the stack on account of the increased friction caused by the weight of the entire stack on the card being removed.

Besides, with the prior art arrangements it is necessary to predeterminedly fix the sequence of feeding of the cards from the magazine to the scanning station, that is, prior to the retrieval or control operations, inasmuch as a change of the feeding sequence after insertion in the magazine may be effected manually only by rearrangement of the cards within the stack.

Furthermore, with the known arrangements, the number of information or control units which may be stored by a single card is limited and dependent upon the size of the cards, whereby in the case of an extended and closed control or operating program the operating steps of which exceed the storage capacity of a single card, two or more cards will be required for the control and carrying out of such program. As a consequence, it may happen frequently that the last card completing the program is not utilized to its full extent or capacity, whereby to reduce the all-over capacity and efficiency of the storage apparatus. Besides, a sequential and uninterrupted retrieval and scanning of the same program is possible only by the provision of cards having identical perforation patterns and being sequentially fed to the scanning or control station. This again results in a decrease of the total storage capacity of the magazine and of the all-over efficiency of the retrieving apparatus of given type or size.

Accordingly, an important object of the present invention is the provision of improved punched storage card retrieval and scanning apparatus of the type referred to and utilizing a single storage magazine by which the foregoing and related difficulties and drawbacks are substantially eliminated, by which a plurality of punched cards are at any time individually available for single or plural sequential retrieval and scanning, and which apparatus is additionally adapted for the scanning or evaluation of special cards in addition to the cards of standard size stored by said magazine.

Another object of the invention is the provision of multiple selector and retrieval mechanism which will enable the selection of any desired card of a stack stored in a magazine, or of any special cards separate from said magazine or stack, to be fed to the scanning station, and by which the card will be automatically returned to its predetermined position with the stack or magazine after use or scanning, substantially independently of the remaining cards.

Yet another object of the invention is the provision of multiple selector mechanism for feeding any of a number of punched cards stored in a magazine to an operating or scanning position, and to return the cards to said magazine after scanning, said mechanism being adapted to simultaneously operate the feeding, scanning as well as auxiliary devices of the scanning apparatus, whereby to enable the retrieval or control to be effected by the operation of a single control element, such as a push button, key or the like.

The invention, both as to its ancillary objects and novel aspects, will be better understood from the following detailed description of a preferred embodiment, taken in conjunction with the accompanying drawings forming part of this specification and in which.

Like reference numerals denote like parts and elements throughout the different views of the drawings.

Figure 1:
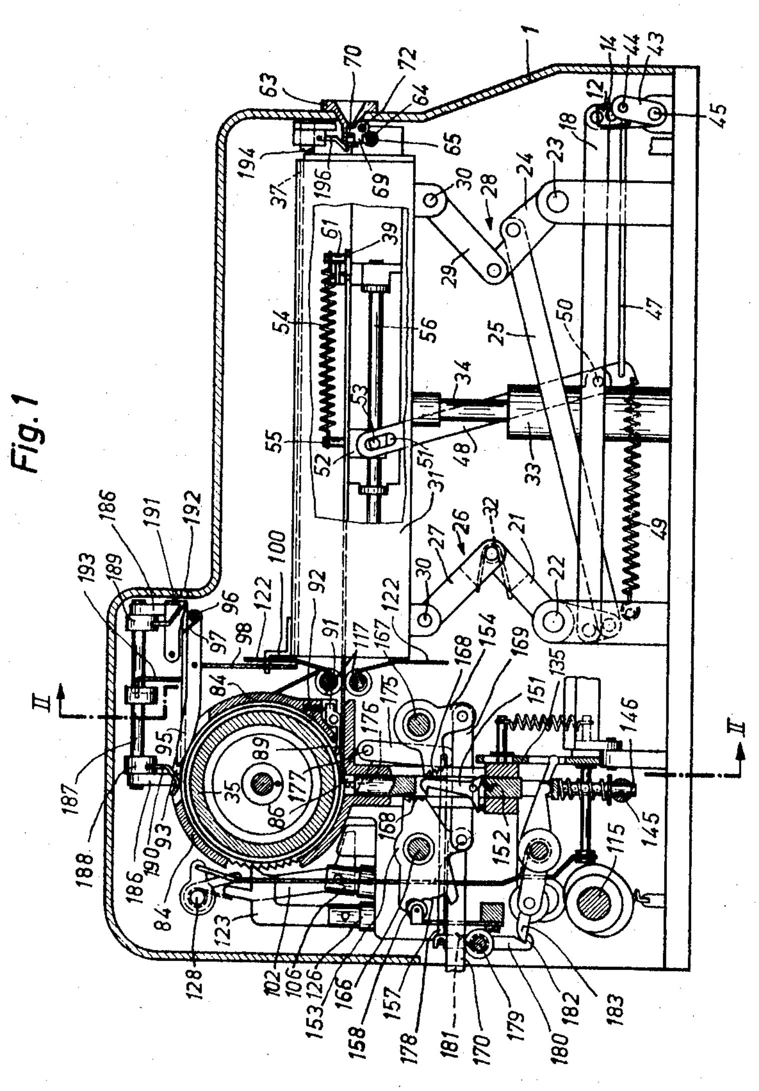
FIG. 1 is a longitudinal cross-sectional view, taken on line I—I of FIG. 2, of a punched card retrieval and scanning device constructed in accordance with the principles of the invention.

With the foregoing objects in view, the invention involves generally the structural and functional combination of a single adjustable storage magazine holding a plurality of punched or perforated control cards, said magazine being arranged for displacement relative to a predetermined card feeding plane, whereby to enable a selective feeding of any of said cards to the scanning station by means of a pickup device and card feed roller, for retrieval of the information stored by the cards or control of a machine or output device, respectively, further means being provided to return the cards after scanning by said roller to their predetermined position within said magazine, for the selective single or plural scanning or retrieval of any of the cards stored in said magazine, or of any special cards not stored, respectively, as will become further apparent as the following description proceeds.

In order to carry into effect the invention, use is made advantageously of an arrangement, whereby the magazine takes the form of a container being fitted on both sides of the card feeding plane with superposed supporting elements forming a multiple shelf structure, individually supporting a plurality of punched cards, and whereby the magazine is mounted upon suitable supporting means displaceable at right angle to the feeding plane, at least one of said supporting means being operably connected, through suitable linkage mechanism, with a profiled selector bar cooperating with a plurality of selector keys or the like each being coordinated with one of the cards stored by said magazine.

The return drive of the feed roller serving to retract the cards into the magazine after a scanning or control operation is advantageously constructed in such a manner as to dispense with any special driving or power source, such as by the provision of the feed roller with a slip coupling for the tensioning of a return spring or the like energy storage device during the forward or feeding movements of said rollers during a scanning operation to thereby effect an automatic return of the cards after completion of a scanning or operating cycle, or prior to the feeding of another card from the stack within the magazine.

In the interest of reducing mounting space required by the feed and scanning mechanism and of providing favorable operating conditions for the punched card feed and scanning operations, there may be provided, in accordance with a further feature of the invention, a guide sleeve or cylinder being coaxial with and surrounding the card feed roller, said sleeve having a passageway coincident with the card feeding plane and being followed by an inlet opening for the feeder pins of the card scanning mechanism.

In order to enable the optional use of a device of the type described in conjunction with special punched cards or strips encompassing a control program which exceeds the capacity of the standard cards stored by the magazine, the latter may be fitted, according to a further improved feature of the invention, with a separate guide or inlet channel for the introduction of the special cards for use ultimately with the standard cards.

Furthermore, in order to avoid the necessity of returning the special cards to the guide or inlet channel of the magazine, upon completion of a scanning or control operation, or to enable the ready or immediate removal of the cards, the guide cylinder may be provided, according to another feature of the invention, with an outlet slot located following said inlet passageway and adapted for cooperation with a suitable stripping element being advantageously carried by the magazine, and adjusted to operative position during scanning of a special card, in the manner described in greater detail hereafter.

In order to afford a selection of any of the individual cards of the stack stored by the magazine, that is, by displacement of the magazine relative to the card stripping or pickup finger and positioning of the guide channel to coincide with the card feeding plane, multiple selector mechanism, such shown by the drawings, is required for the control by the operator which, in addition to the selection of a desired card or program, advantageously also controls the feeding and scanning mechanism, in accordance with a special object and novel aspect of the present invention. Such combined selecting, feeding and operating mechanism is furthermore advantageously constructed in such a manner as to provide, both for said guide channel and each of the stacked cards, a multiple-action control key or the like cooperating with a number of profiled selector bars to provide an integrated selector and control unit, in the manner shown by the drawings and described in further detail in the following.

While introducing a special punched card into the device, care must be exercised to insert the card in proper or unreversed position, in order to prevent scanning in the reverse direction. According to a further feature of the invention, proper insertion of the special cards is ensured by the provision between the magazine and the inlet opening or feeding funnel for the special cards of a lever excentric with said funnel and having an arm engaging a locking lever disposed laterally of said first lever, in the manner as will become obvious from the ensuing description of the drawings.

Figure 2:
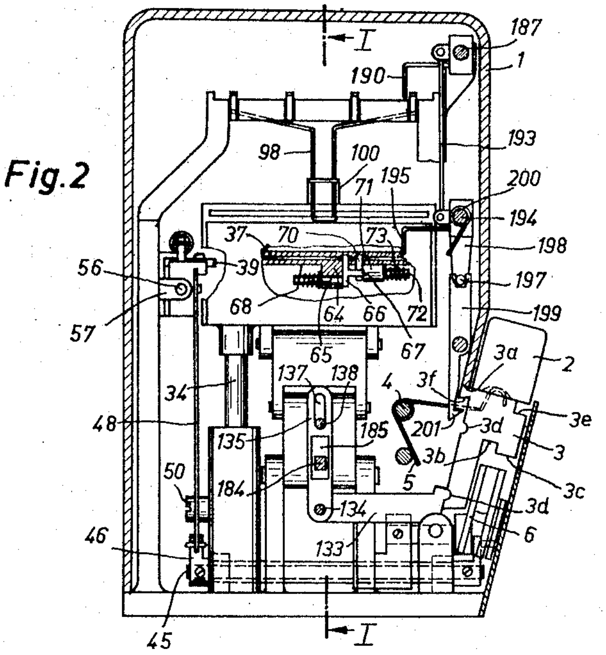
FIG. 2 is a further cross-section through the device of the invention taken on line II—II of FIG. 1.

Referring to the drawings, the numeral 1 represents a casing being fitted along one of its longitudinal or side walls with a keyboard comprising a plurality of control keys 2, FIG. 2, one for each of the punched cards stored in the device and for the special cards, respectively. Each of the keys 2 carries a profiled multiple-control plate 3 and is urged to its starting or OFF position by means of a spring 5 encircling a bolt 4 secured to the casing 1, the keys being normally locked in the OFF position by a nose or stop 3*a* of the plate 2 engaging the casing 1, in the manner shown in FIG. 2. Each of the keys 2 is provided with a control edge 3*b* adapted to cooperate with a profiled selector bar or strip 6 having an array of juxtaposed triangular teeth 7 separated by vertical slots 8, FIG. 3, and being provided with a pair of longitudinal slots 9 through which project guide pins or rods 10 secured to the casing 1, to enable a lengthwise displacement of the bar 6 upon depression of any of the keys 2 by virtue of the edge 3*b* engaging or camming with one of the slanting sides of the teeth 7. The control plates 3 are arranged in unsymmetrical relation to the respective keys such as to cause each edge 3*b* upon depression of the associated key 2 to initially engage a predetermined point of the teeth 7 and to, in turn, effect a corresponding lengthwise displacement of the bar 6 before the plate 3 is enabled to enter and to engage a slot 8.

The selector bar 6 is provided with a further transverse slot 11 at one end being engaged by a sliding block 12 rotatably mounted upon a pin 13. The latter is connected to a first arm 14 of a U-shaped double lever 15 mounted upon a hollow shaft 17 which is in turn rotatably supported by the casing 1. Articulated to the second arm 16 of the U-shaped lever 15 is a pull rod or bar 18 having its opposite end connected to an arm 19 of an angular lever 20 which is mounted upon a horizontal shaft 22 journalled in the casing. Arranged in a position parallel to the shaft 22 is a second shaft 23 carrying a lever 24 which is connected, through a connecting rod 25, with the arm 19 of the lever 20, whereby to synchronize the movements of both levers 20 and 24 for the displacement of the punched card magazine, in the manner to be further described presently.

Connected to the remaining arm 21 of the lever 20 is a further articulated lever or link 27 forming a support 26 and, similarly, connected to the lever 24 is an articulated lever or link 29 forming a support 28. Both links 27 and 29 are in turn connected at their upper ends to the underside of a card storage magazine 31 through a pair of bolts or shafts 30. Operably interposed between the arm 21 of the lever 20 and the link 27 is a torsion spring 32 being so designed as to balance the weight of the magazine 31 supported by the links 27 and 29 and to normally maintain the magazine at a mean vertical position relative to the predetermined card feeding plane.

of the device. In order to provide proper guidance of the magazine 31 in the vertical direction, the same is provided, in the example shown, with a depending bolt or guide rod 34 movable within a stationary sleeve or tube 33.

Figure 3:
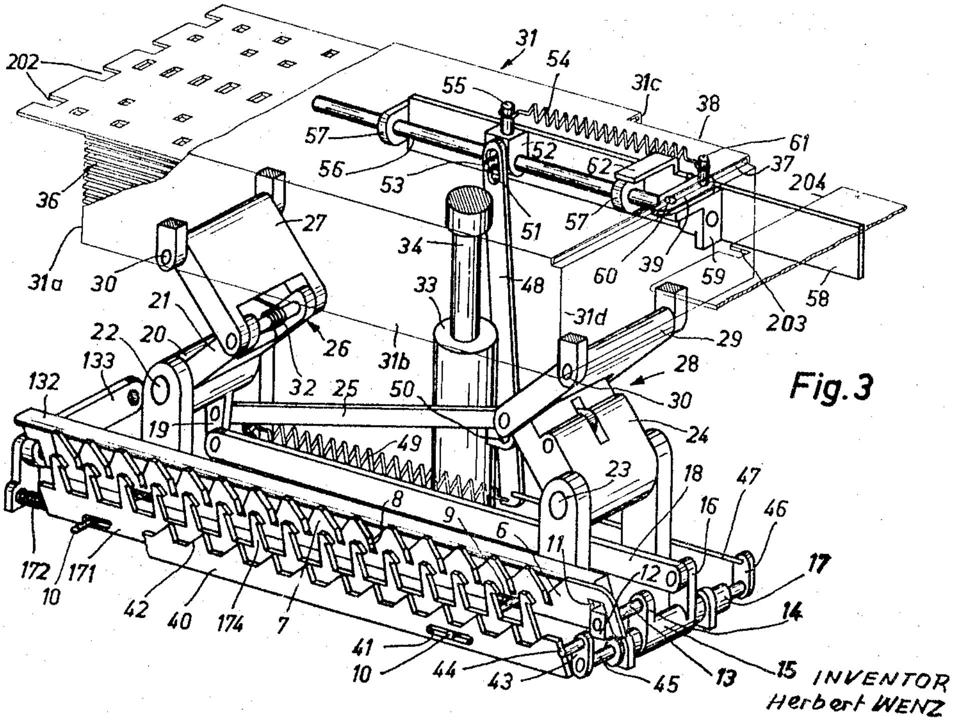
FIG. 3 is a partial perspective view of the card storage magazine and its operating mechanisms forming part of the device according to the invention.

The magazine 31 is comprised of a rectangular casing having an open front 31*a*, FIG. 3, facing the card feed roller 35, FIG. 1, and scanning device and having its side walls 31*b*, 31*c* fitted with inwardly facing horizontal ribs or supporting ledges 36 providing a shelf-like structure for the individual support and guidance of a plurality of punched cards, the number of which and in turn of the shelfs 36 may be chosen to suit any existing operating conditions and/or requirements. Above the supports 36 upon the top of the magazine 31 there is provided an auxiliary guide channel or slot 37, FIGS. 1 and 3, destined for the alternate use of special punched cards or strips separate from the standard cards stored in the magazine 31. The portion of the side wall 31*c* adjoining the end wall 31*d*, which latter is closed up to the lower edge of the channel 37, is provided with a lateral recess 38, to afford access to a card pushing lever or pickup finger 39 mounted at the feeding height or plane of the device, said finger during operation moving within the space between the edge of the cards to be fed and the end wall 31*d* of the magazine 31, to effect an initial feed or advance of the cards towards the feed roller and scanning device, in the manner to be further described presently.

The operation of the pickup finger 39 is controlled by a shift bar or strip 40 parallel to the selector bar 6 and being longitudinally movably supported by slots 41 being engaged by the pins or rods 10, FIG. 3. Bar 40 has a sawtooth-shaped profile with its slanting tooth edges 42 arranged to cooperate with the edges 3*c* of the plates 3 of the keys 2, FIG. 2. The slanting front edge of the bar 40 resiliently engages a follower pin 44 carried by a crank 43, the latter having an end connected to a shaft 45 which is mounted within the hollow shaft 15. The latter carries a second crank 46 at its opposite end to which is articulated a connecting rod 47 connected to one end of a double lever 48. Proper resilient engagement between the shift bar 40 and the follower pin 41 is provided by a tension spring 49 having one end connected to the casing 1 and having its remaining end connected to the lower end of lever 48.

The lever 48 being rotatably supported upon a pin 50 secured to the casing 1 has its upper end provided with a slot 51 to compensate for its radial movement, said slot being engaged by a pin 53 which is secured to a sliding block or member 52. Member 52 being fitted with a further vertical pin 55, supporting one end of a tension spring 54, is fixedly secured to a push rod 56 being guided by a pair of bearings 57 which extend from a guide or supporting plate 58 secured to the casing 1. Further connected to one end of the rod 56 is a guide piece 59 engaging the plate 58 and securing said rod against rotation. Rotatively supported by the guide piece 59, by means of a pin 60, is one end of the card stripping or pickup finger 39 which carries a further pin 61 at its opposite end supporting the remaining end of the spring 54.

Plate 58 has a projection 62 arranged to be engaged by the pin 61 of the finger 39 immediately prior to the end of a feed or pickup movement of rod 56, whereby to cause the finger 39 to rotate about the pin 60 and to be operated or retracted to a position outside of the magazine 31. The finger 39 will remain in this retracted position after initial ejection of a card and will be returned to its initial or operative position by the spring 54 upon the starting of a return stroke movement, as described in further detail in the following.

In order to insert the special cards, the casing 1 is fitted at one end wall and at a vertical position coinciding the card feeding plane with a feeding funnel 63, FIG. 1, upon the underside of which there is provided a bolt 65 rotatably supported by a bearing 64, FIG. 2, said bolt carrying at one end a lever 66 projecting into the opening of the funnel 63. Lever 66 has a lateral arm 67 being urged against a horizontal rod 69, extending from a blocking lever 70, by the action of a tension spring 68 encircling the other end of the bolt 65. The blocking lever 70, being arranged laterally of the lever 66 and fixedly connected to a bolt 72 which is rotatably supported by a bearing 71 connected to the funnel 63, is similarly urged towards said funnel by the action of a spring 73 encircling the bolt 72.

Figure 4:
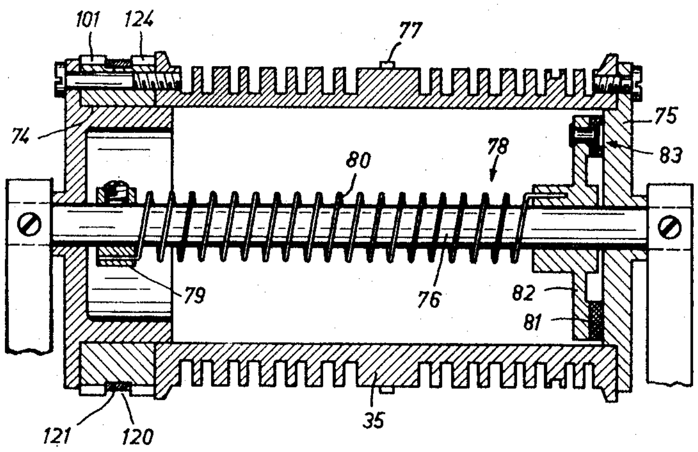
FIG. 4 is a sectional view taken on line IV—IV of FIG. 5.
Figure 5:
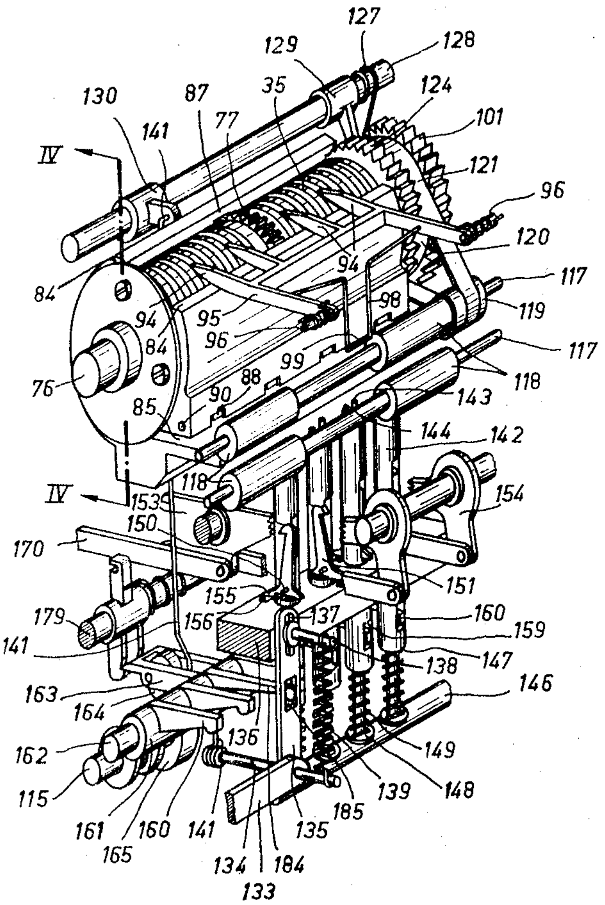
FIG. 5 is a partial perspective view of the punched card feed roller and scanning mechanism of the device according to the invention.

In order to pass the stored and the special cards through the scanning station, there is provided a feed roller 35, FIGS. 4 and 5, in the form of a hollow cylinder and fitted with a pair of end walls or supporting discs 74, 75 which are rotatively mounted upon a shaft 76, secured to the casing 1. Provided upon the center portion of the feed roller 35 is a gear 77 adapted to cooperate with a row of central perforations of the cards or strips to be fed, in a manner well known and understood. Mounted within the roller 35 is a return drive 78 for returning the cards to the magazine after use or scanning. The return drive, in the example shown, comprises a setting ring 79 mounted upon the shaft 76 to which is attached one end of a torsion spring 80 encircling said shaft and having its remaining end arranged to project into a bore of a friction coupling disc 82 being fitted with a friction surface 81 and forming a slip coupling 83 together with the end wall 75 of the feed roller.

Mounted upon and in spaced relation to the feed roller 35 is a coaxial guide sleeve or cylinder 84 having an inlet slot or feed opening 85, FIG. 5, for the punched cards and a passageway 86, FIG. 1, for the feeler and scanning elements. As a consequence, a punched card having been inserted into the opening 85 in the direction towards the scanning point is guided by the intervening space 87 between the roller 35 and the sleeve 84, FIG. 5, and bent around the outer surface of said roller. Projecting into the inlet opening 85 is a card stripping member 89 having four arms 88 which are rotatively supported through a pin 90 by the sleeve 84 and which are urged against the outer surface of the roller 35 by the action of the compression spring 92 engaging an extension 91, FIGS. 1 and 5. The sleeve 84 is further provided at its top with an outlet slot or opening 93 extending over the entire length thereof and through which project four prongs 94 of a card deflector member 95. The latter is rotatively supported by a pair of pins 96 and is normally maintained at a predetermined distance from the feed roller 35 by the action of torsion springs 97, FIG. 1. Connected to the deflector member 95 is a U-shaped or stirrup member 98 having a cross-piece 99 adapted to engage a control arm 100 attached to the magazine 31 in the position with the feed channel 37 for the special cards coinciding with the card feeding path of the device.

Figure 6:
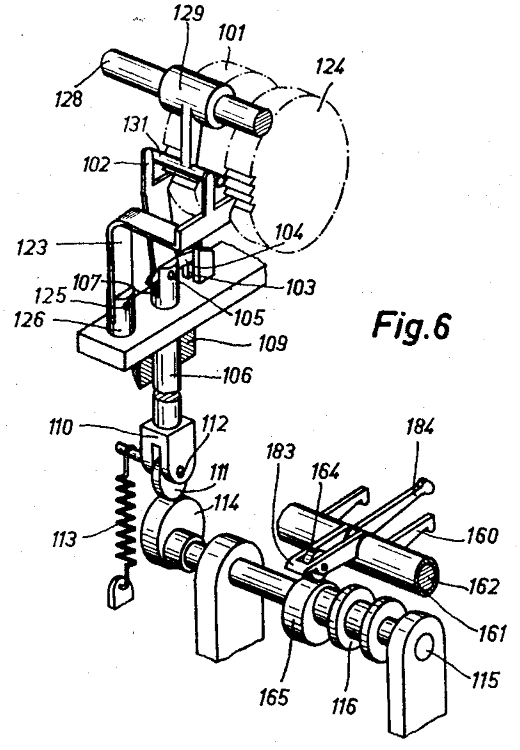
FIG. 6 is a perspective partial view of the drive mechanism for the card feed roller.

In order to drive the feed roller 35, there is attached to the end wall 74 a ratchet wheel 101, FIG. 6, cooperating with a pawl 102 which is provided at its lower end with an extension 104 engaging a guide slot 103, to prevent rotation thereof, and which is linked to a push rod 106 through a pin or pivot 105. The pawl 102 is urged into engagement with the ratchet 101 by the action of a spring 107, and the push rod 106 being guided in a stationary sleeve 109 carries at its lower end a fork 110 which in turn supports a roller 111 mounted upon a pin 112, a tension spring 113 being attached between the latter and the casing, as shown by the drawing. The spring 113 acts to urge the roller 111 into engagement with an excentric 114 mounted upon a horizontal drive shaft 115 being driven through a pulley 116 in synchronism with the machine or device being controlled by a punched card or strip. As a consequence, the pawl 102, in the example shown, advances the feed roller 35 by one tooth during each revolution of the drive shaft 115 against the action of the spring 80, FIG. 4.

In order to feed a punched card, after partial ejection from the magazine 31 by the stripper or pickup finger 39, to the feed roller 35, there are further provided two pairs of pressure feed rollers 118 projecting into the feeding path, FIG. 5, and located between the magazine 31 and the feed roller 35, said rollers being supported by shafts 117 attached to the casing. The upper pressure rollers are driven through a pulley 119, FIG. 5, being in driving connection with the feed roller 35 through a belt 121 engaging a groove 120 adjoining the ratchet 101. Secured to the shafts 117 are a pair of guide blades 122 which serve to prevent slipping out of the cards from the magazine 31 during the up and down movement of the latter, on the one hand, and which will ensure the safe retraction or return of the cards into the magazine after a scanning operation.

Further attached to the end 74 of the feed roller 35 is a ratchet wheel 124 cooperating with an angular pawl 123, FIG. 6, which is linked, through a pin 125, with a post 126 attached to an extension of the casing 1 and which is continuously urged through a torsion spring 127, FIG. 5, into engagement with the ratchet 124. The spring 127 is attached to a shaft 128 being parallel to the shaft 76 of the feed roller 35 and carrying a first T-shaped release lever 129 and a further lever 130. The release lever 129 engages with its cross-piece the rear of the pawls 102 and 123, in such a manner as to retract the pawls from their associate ratchets upon rotation of the shaft 128.

Rotation of the shaft 128 is also controlled by the displacement of the control plates 3 of the selector keys 2. For this purpose, the plates 3 are provided with semicircular recesses *3d*, FIG. 2, being engaged by a release bar or plate 132, FIG. 3, rotatively supported by the casing 1. Bar 132 has an extension arm 133 to which is linked, by means of a pin or pivot 134, FIG. 5, a plate or bar 135 being secured against rotation by means of a pin 138 carried by a guide member 136 and projecting into a slot 137 of the plate 135. A spring 139 being attached at one end to the pin 138 and at the other end to the pin 134 serves to urge the shift plate 132 into engagement with the control plates of the selector keys 2. Attached to the pin 134 is a push rod 141 serving to impart rotary motion to the shaft 128 by way of the lever 130.

For the scanning of the punched cards or strips, there are provided, in the example shown, eight scanning rods or plungers 142, FIG. 5, slidably mounted in the guide member 136, each of said plungers being provided at its upper end with a first feeler pin 143 of relatively great height and a second pin 144 of relatively small height and spaced from said first pin. The lower ends of the plungers 124 are each guided in a bore 145, FIGS. 1 and 5, of a bolt or bar 146 and the plungers are urged in the direction towards the feed roller 35 by the action of compression springs 149 engaging shoulders 149 of the plungers, on the one hand, and discs 148 overlying the bores 145, on the other hand. Above the guide member 136, each plunger 142 is fitted with a pawl 151 rotatable about a pin 150, said pawls alternately pointed in opposite directions and being urged against a pair of coordinated control levers 153, 154 by the action of springs 152, FIG. 1. In order to limit the rotation of the pawls, each pawl is provided with stop 155, FIG. 5, adapted to engage an abutment 156 upon the member 136.

The plungers 142 are furthermore provided with crossbores or openings 159 being engaged by an arm 160 of a rake member 161 which is rotatively supported by a shaft 162. The center of the rake member 161 has a fork-like extension 163 supporting a roller 164 which engages the excentric 165 mounted upon the drive shaft 115, FIG. 6. The excentric 165 is designed in such a manner as to urge the plungers 142 during the rest positions of the step-by-step operated feed roller 35 against the punched card by the action of the springs 149, and to retract said plungers from the cards at the initiation of a feed movement of the roller 35 by the roller 162.

The control levers 153 have a profiled edge 157, FIG. 1, being engaged by a spring-urged roller 158, to arrest the levers in their respective operating positions. The control levers 153 are supported by a shaft 166, FIG. 1, secured to the casing, while the levers 154 are supported by a shaft 167 and are provided with a toothed edge 168 engaged by the pawls 151, in such a manner as to rotate said levers by the width of one or two teeth, respectively, depending upon the depth of penetration of the plungers 142, or the feeler pins 143, 144, into the perforations of a punched card or strip. The depth of penetration of the plungers may depend upon the arrangement of the perforations in the manner as follows:

(1) No perforation—no penetration—small operating stroke—no control movement.

(2) One perforation for the longer scanning pin—penetration until the shorter pin engages the card—medium operating stroke—pawl moves the coordinated operating lever by the width of one tooth.

(3) Two perforations for both scanning pins—maximum operating stroke—pawl moves the control lever by two tooth widths.

The control levers 153 and 154 are interconnected through a link 169, whereby to enable the attainment of a control movement in both directions to be imparted to a lever or operating member 170 connected with the machine being controlled.

In order to retain the magazine 31 during a scanning operation in its position after rejection or withdrawal of a punched card, there is further provided a locking bar 171 intermediate the selector bar 6 and the shift bar 40, FIG. 3. The locking bar 171, being urged into engagement with the control plates 3 by the action of a spring 172, is provided with a plurality of locking hooks 174 adapted to cooperate with the plates 3, FIG. 2, to effect a release by cooperation with the edges *3e*, and to effect locking by cooperation with the edges *3e*, and to effect locking by cooperation with the edges *3c*, respectively.

In order to safeguard the device against double insertion of punched cards, suitable feeler elements are provided cooperating with the feed roller 35 and controlling the feeding of the cards. For this purpose, there is provided, in the examples shown, a first feeler 176 in the form of an angular lever 175, FIG. 1, being rotatably supported by a pin 177 and connected through a pull rod 178 with a hook member 180 which is rotatably mounted upon a pin or bolt 179. The feeler 176 is urged into engagement with the feed roller 35 by the action of a torsion spring 181 encircling the bolt 179. The hook 180 is provided at its lower end with a nose 182 adapted to cooperate with an extension 183 of the rake member 161 and acting to retract the roller 164 of the latter, FIG. 6, from engagement with the excentric 165, if the feeler 176 engages the feed roller 35. In order to operate the rake member into engagement with the excentric 165, the former has an arm 184 projecting into a recess 185 of the bar 135, FIG. 5.

Mounted upon a shaft 187 supported by the casing, by a pair of supporting members 188, 189, FIG. 1, are two feeler levers 190 and 191. The lever 190 engages the feed roller 35 through the guide sleeve 84, while the lever 191 serves to engage the special cards or strips at a point immediately ahead of the outlet slot 192 of the casing 1.

The shaft 187 is connected, through a tie or connecting rod 193, with a shaft 194 parallel to the longitudinal side of the magazine, FIG. 2, and carrying a pair of further feeler levers 195, 196, FIGS. 1 and 2. The lever 195 at one end of the shaft 194 projects into the feeding path between the pressure roller 118 and the feed roller 35, while the lever 196 at the other end of the shaft 194 projects into said path at a point between the magazine 31 and the feeding funnel.

The shaft 194 is operably connected, by way of a link 198 and pin 197, with a hook 199, FIG. 2, the latter being held out of the path of the nose *3f* of the plates 3 by the action of a torsion spring mounted upon said shaft, if no card has been inserted in the device. If, on the other hand, card is within reach of the levers 190, 191, 195, 196, the hook 199 by its nose 201 prevents the operation or depression of the selector keys 2.

The operation of the device afore-described is as follows:

Let it be assumed that it is desired to evaluate one of the cards stored by the magazine 31, while a previously evaluated card is still upon the roller 35, that is, while one of the keys 2 is locked in its lowermost depressed position. If now the key coordinated with the desired card is depressed, it may be initially moved to a limited extent only until the nose *3f*, FIG. 2, engages the nose 201 of the latch member 199. During this initial movement of the key, the bar 132, FIG. 3 is released from the recesses *3d*, whereby to move the arm 133 in a downward direction. As a consequence, the plate 135, FIG. 5, displaces the arm 184 of the rake member 161 also downwardly, whereby the arms 160 of said member retract the plungers 142 from the punched card wound around the roller 35. At the same time, the pull rod 141 imparts rotational movement to the shaft 128, whereby in turn the release lever 129 through its cross-piece engages both pawls 102 and 123, to retract the same from the ratchets 101 and 124, respectively. The previously tensioned torsion spring 80, FIG. 4, becomes now effective by way of the slip coupling 83, whereby to return the card in counterclockwise direction to the magazine 31. During this operation, the spring-urged stripper 89 engages through its arms 88 recesses 202, FIG. 3, upon the front edge of the cards, whereby to lift the latter from the feed roller 35 and to return the same through the rollers 118 to the original storage position within the magazine 31.

After the card has emerged from the roller 35, the feeler 176 engages the latter, whereby to impart rotary motion to the latch member 180 by way of the pull rod 178. As a consequence, member 180 engages the extension or nose 183 of the rake member 161, thereby to retract the roller 164 from the excentric 165. The card, upon retraction by the roller 35, is moved further by the drive rollers 181 until being released from the latter, whereupon no longer any of the feelers 190, 191, 195, 196 engages the card and the shaft 194 is enabled to rotate by the action of spring 200, retracting thereby the latch 199 from the path of the control plate 3 by the way of lever 198. The key 2 may now be further depressed until the edge 3c engages the slanting edge of an associated locking hook 174, whereby to displace the locking bar 171 to the left against the action of the spring 172. As a consequence, the key which had previously been depressed and locked is now released and returned to its OFF position by the action of spring 5. At the same time, the spring 49 moves, by way of the connecting rod 43 and crank 42, the shift bar 40 also to the left, whereby to operate, by way of the double lever 48, the push rod 56 and pickup finger 39 to the right to a position adjoining the magazine 31. This, in turn, results in a rotation of the finger 39 about the pivot 60 to its operative position by the action of the spring 54. During depression of the key, the edge *3b* engages the selector bar 6, whereby to displace the latter to the right or left until engaging one of the slots 8. Bar 6 imparts a rotary motion to the angular lever 20 by way of the crank 15 and pull rod 18, lever 20 in turn imparting its motion to the lever 24 through connecting rod 25, whereby to adjust the magazine in the vertical direction until positioning the card coordinated with the depressed key 2 to coincide with the fixed feeding plane of the device. In this position, the magazine is locked by the locking bar 171, displaced to the right by the spring 172, with the edge *3c* engaging the underside of a locking hook 174.

If the key is now operated to its lowermost position, the edge *3c* engages one of the sawtooth edges to thereby displace the shift bar 40 to the right and to cause rotary motion to be imparted to the double lever 48 by way of the rod 47, in such a manner as to cause the pickup finger 39 to engage the edge of the punched card and to eject the same from the magazine to an extent sufficient to cause the gear teeth 77 of the feed roller 35 to engage the central perforations of the card, in the manner pointed out hereinbefore. Shortly before the end of the longitudinal movement of the finger 39, the pin 61 engages the extension 62, whereby to rotate said finger about the pin 60 and to retract the same to a position clear of the magazine. In the lowermost position of the key 2, the release bar 132 engages the upper semicircular recess *3d*, the spring 127 causes the pawl 123 to engage the ratchet 124, and the spring 107 causes the control lever 102 to engage the ratchet 101. At the same time, bar 135 moving in the upward direction releases the arm 184 of the rake member 161, whereby the feeler pin 143, 144 of the scanning plungers 142 are operated into engagement with the card by the action of the springs 149. The feed roller 35 is advanced by way of lift rod 106 and lever 102, by one tooth width of the ratchet 101 during each revolution of the drive shaft 115, rotating synchronously with the machine being controlled. During these feed movements, the return spring 80 is tensioned intermittently. The pawl 123 and ratchet 124 serve to prevent a return movement of the roller 35 during the feeding operations.

During the resting intervals of the feed roller 35, the pins 143, 144 penetrate the punched card in accordance with the perforations and are retracted from the card by the excentric 165 and rake member 161. As a consequence, the pawls 151 engage the teeth 168 of the operating levers 153, 154, whereby to impart a corresponding control movement to the control link or rod 170 for the operation of the machine to be controlled in accordance with the program stored by the card being scanned. During the scanning of a standard card, the card deflector 95 is maintained by the spring 97 in such a position as to cause the card being scanned to be wound around the roller 35.

The card wound upon the roller 35 may be scanned repeatedly in succession, or without return to the magazine, whereby the roller performs a full revolution during each scanning operation and the slip coupling 83 starts to overrun after two consecutive scannings. The sequential scanning of the same card may be continued until stopped by the disconnection of the machine being controlled, or by repeated operation as described by the depression of a different selector key.

If it is desired to use a special card, the coordinated key 2 is depressed. In such a case, if there is still a standard card within the device, the operations afore-described are repeated up to the locking of the key. As a consequence, the magazine 31 will be in its lowermost position, thus causing the inlet channel 37 to coincide with the feeding plane and to provide a free path from the feeding funnel 63 through the channel 37 to the roller 35. Furthermore, the card deflector 95 has been operated into engagement with the feed roller 35 by the arm 100 carried by the magazine 31 engaging member 98, whereby to deflect the special cards or strips from said roller and to free the path for the cards to the exit slot 192. If now a special card is introduced into the funnel 63, that is, such that it enters with its central slot 203, FIG. 3, pointing in the direction of the funnel 63, it may be advanced to a position until being seized by the teeth 77 of the roller 35. During the introduction of the special cards, a rotary motion is imparted to the lever 66 by the front edge 204 of the cards, whereby the locking lever 70 engages the recess 203 of the card and is rotated about the bolt 72 after the front edge 204 has retracted the lever 66 out of its path, thus freeing the passage to the roller 35.

If a special card is fed in the wrong position, it first engages the locking lever to which it is displaced towards the opening of the funnel 63 both by the spring 73 as well as by the lever 66, thus preventing continued insertion of the card. The special card upon seizure by the roller 35 is then scanned in the manner described and ejected through the outlet slot 192 upon completion of the scanning operation.

In the forgoing the invention has been described in reference to a specific illustrative device. It will be evident however, that variations and modifications, as well as the substitution of equivalent parts and elements for those shown for illustration, may be made without departing from the broader scope and spirit of the invention as set forth in the appended claims. The specification and drawings are accordingly to be regarded in an illustrative rather than in a restrictive sense.

I claim:

1. Punched card retrieval and scanning apparatus comprising scanning mechanism, a magazine including multiple supporting means for storing therein a number of cards in spaced superposed relation for selective individual retrieval and delivery to said scanning mechanism along a fixed horizontal feeding plane parallel to the cards stored within said magazine, operating means to displace said magazine at right angle to said plane, to operate a selected card into a position coincident with said plane, for removal and delivery to said scanning mechanism, stationary ejecting means coincident with said plane for ejecting and feeding a selected card to said mechanism, automatic return means operably associated with said scanning mechanism, to return the cards after scanning to their respective storage positions within said magazine, supporting means for said magazine, a multiple-key operated profiled selector bar mechanism, each of the keys of said mechanism being coordinated with one of the cards stored in said magazine, and linkage means connecting said mechanism with said supporting means, said selector bar designed to selectively operate said magazine by said keys to a position of coincidence of the respective cards with said plane.

2. In punched card retrieval and scanning apparatus as claimed in claim 1, including a card feed roller and intermittent drive means therefor forming part of said scanning mechanism, return spring means connected to said roller to be tensioned by the sequential feed movements thereof and adapted to return the cards by rotation of said roller in a direction opposite to the feed direction upon release from said drive means after completion of a scanning operation.

3. In punched card retrieval and scanning apparatus as claimed in claim 1, including a card feed roller, intermittent drive means therefor and a plurality of scanning plungers forming part of said mechanism, to sequentially advance and scan a card delivered by said ejecting means a coaxial guide cylinder surrounding said roller, to provide a guideway for the cards around said roller, said cylinder having an inlet opening for said cards coincident with said plane and a second opening forming a passageway for said plungers.

4. In punched card retrieval and scanning apparatus as claimed in claim 1, including an auxiliary feed channel for special cards forming part of said magazine and being adjustable by said control means, for the optional use of the permanently stored cards in said magazine and said special cards, respectively.

5. In punched card retrieval and scanning apparatus as claimed in claim 4, including an outlet opening in said guide cylinder, and a card deflector passing through said opening being normally held in spaced relation to said feed roller, and means to operate said deflector into engagement with said roller in response to said magazine being positioned with said auxiliary channel in operative position for the scanning of a special card.

6. In punched card retrieval and scanning apparatus as claimed in claim 1, including adjustable supporting means of said magazine, said selector bar mechanism comprising: a plurality of selector keys, one for each of the cards stored in said magazine, each said keys including multiple control elements, a profiled selector bar actuatable by a first control element of said keys and operably connected with said supporting means, to selectively operate said magazine by said keys to a position of coincidence of the respective cards with said feeding plane, a profiled shift bar actuatable by a second control element of said keys and operably connected with said ejecting means, to feed the cards selected by said first bar to said scanning mechanism by continued operation of said keys.

7. In punched card retrieval and scanning apparatus as claimed in claim 6, including a profiled locking bar actuatable by a third control element of said keys, to lock said selector and shift bars in the operative position.

8. In punched card retrieval and scanning apparatus as claimed in claim 1, including an auxiliary feed channel for special cards forming part of said magazine and adjustable by said control means, for the optional use of the permanently stored cards in said magazine and of said special cards, respectively, and blocking means associated with said auxiliary channel responsive to a special card being passed through said mechanism, to prevent insertion of more than one special card into said auxiliary channel during a scanning operation.

9. Punched card retrieval and scanning apparatus comprising scanning mechanism including a feed roller with intermittent drive means therefor, a magazine including multiple supporting means for storing therein a predetermined number of punched cards in spaced superposed relation for the individual selective retrieval and delivery of the cards to said scanning mechanism along a fixed horizontal feeding plane parallel to the cards stored in said magazine, operating means to displace said magazine at right angle to said plane, to place a selected card in position coincident with said plane preparatory to its removal and delivery to said scanning mechanism, stationary ejecting means at a position coincident with said plane, for feeding a selected card to be intermittently advanced by said roller for scanning by said mechanism, and return spring means operably connected to said roller to be tensioned by the intermittent feed movements thereof, to return a card to its assigned position within said magazine by said spring means rotating said roller in the opposite direction upon release of said drive means after completion of a scanning operation.

10. In punched card retrieval and scanning apparatus as claimed in claim 9, including an auxiliary feed channel for special cards forming part of said magazine and adjustable by said operating means to a position coincident with said feeding plane, for the optional use of any of the permanently stored cards in said magazine and of said special cards, respectively.

References Cited by the Examiner

UNITED STATES PATENTS

| | | | |
|---|---|---|---|
| 2,918,656 | 12/1959 | Nolde et al. | |
| 3,024,982 | 3/1962 | Algier et al. | 235—61.11 |
| 3,060,413 | 10/1962 | Parks. | |

MAYNARD R. WILBUR, *Primary Examiner.*

DARYL W. COOK, *Assistant Examiner.*